United States Patent [19]

Nelson et al.

[11] Patent Number: 4,756,010
[45] Date of Patent: Jul. 5, 1988

[54] ASYNCHRONOUS/SYNCHRONOUS DATA RECEIVER CIRCUIT

[75] Inventors: Leonard E. Nelson, Boynton Beach; Charles M. Mellone, Boca Raton, both of Fla.

[73] Assignee: Motorola, Inc., Schaumburg, Ill.

[21] Appl. No.: 795,797

[22] Filed: Nov. 7, 1985

[51] Int. Cl.$^4$ ............................................. H04L 27/06
[52] U.S. Cl. ....................................... 375/94; 375/116; 375/106; 375/120; 340/825.21; 455/38; 370/92
[58] Field of Search ................. 375/94, 106, 110, 114, 375/116, 118, 120, 107; 370/91, 92, 94; 455/38; 340/825.21, 825.44

[56] References Cited

U.S. PATENT DOCUMENTS

| | | | |
|---|---|---|---|
| 3,855,576 | 12/1974 | Braun et al. | 375/94 |
| 4,053,708 | 10/1977 | Hotchkiss | 375/106 |
| 4,151,367 | 4/1979 | Nicolini et al. | 375/106 |
| 4,231,114 | 10/1980 | Dolikian | 375/107 |
| 4,454,383 | 6/1984 | Judd | 375/113 |
| 4,457,005 | 6/1984 | Burke et al. | 375/120 |

Primary Examiner—Robert L. Griffin
Assistant Examiner—Marianne Huseman
Attorney, Agent, or Firm—Martin J. McKinley

[57] ABSTRACT

In a communications system wherein a transmitted message is preceeded only by an address, an asynchronous circuit detects the address and provides an initializing signal to a synchronous clock recovery circuit so that the first bit of the recovered clock signal is synchronized to the first bit of the message. During the transmission of the message the synchronous clock recovery circuit makes minor adjustments to the phase of the recovered clock to maintain synchronization between the recovered clock and the message. At the termination of the message, the synchronous clock recovery circuit is inhibited until the asynchronous circuit detects another address.

20 Claims, 12 Drawing Sheets (FIRST PREFERRED EMBODIMENT)

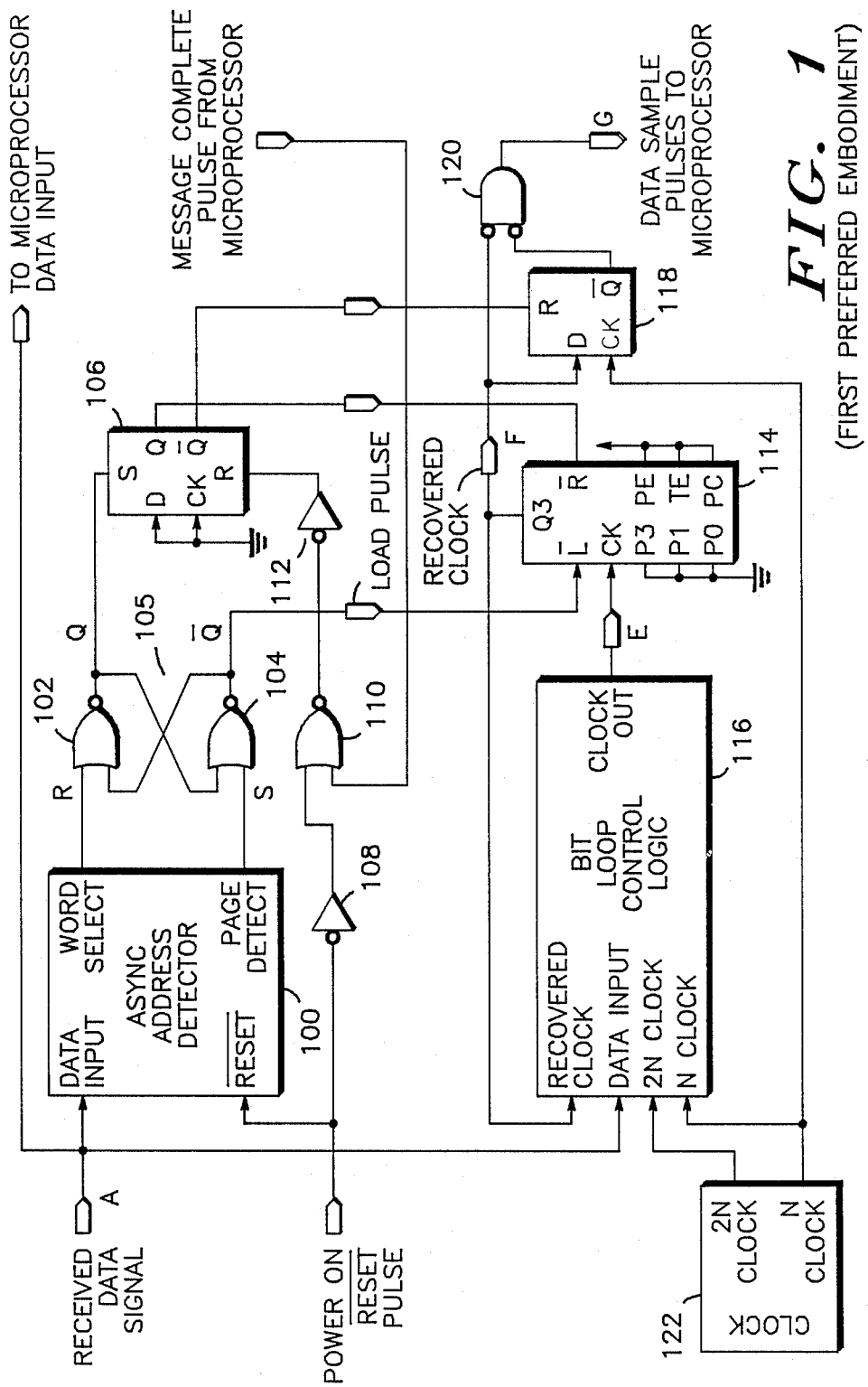

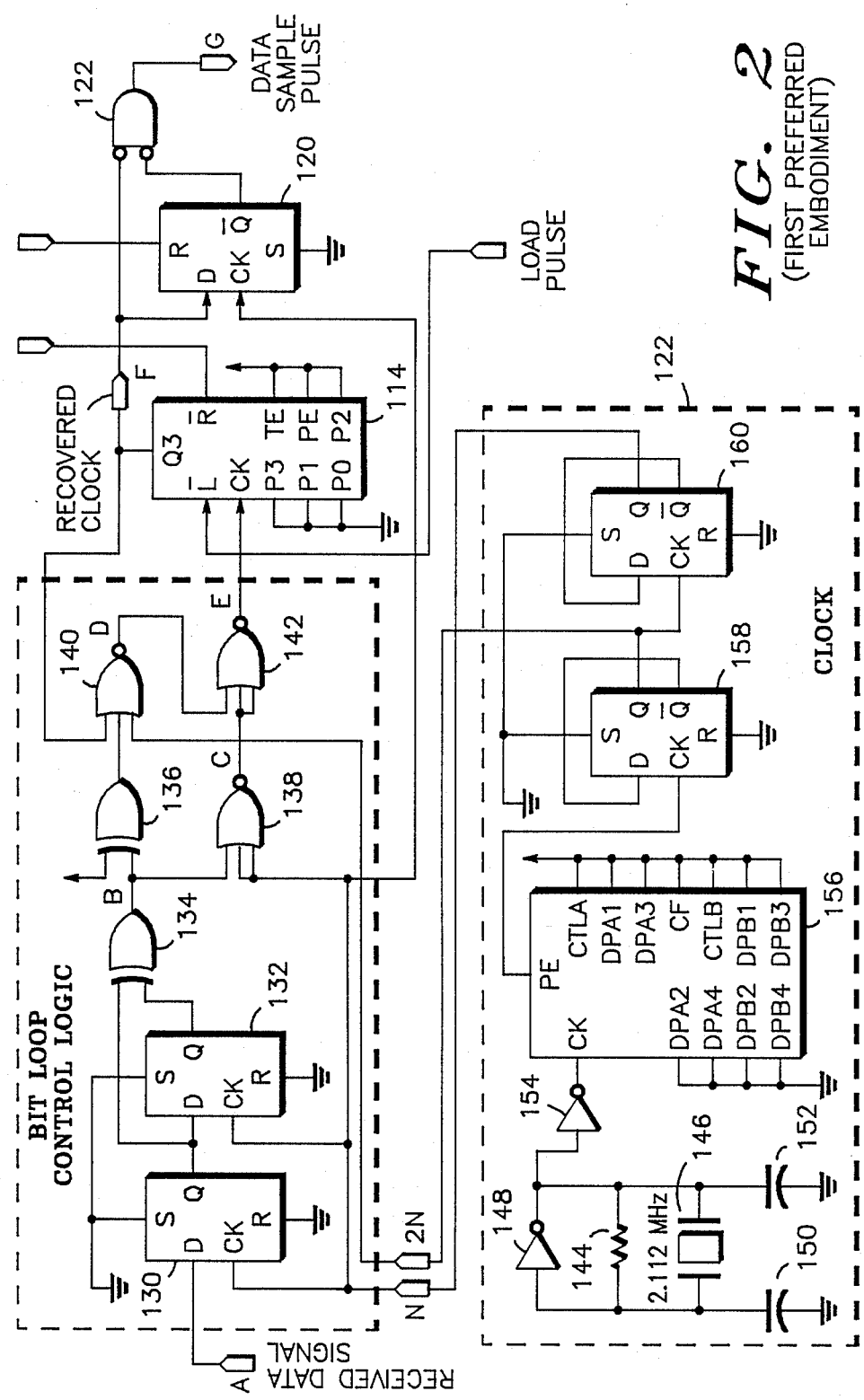
FIG. 2 (FIRST PREFERRED EMBODIMENT)

(FIRST PREFERRED EMBODIMENT)

FIG. 5 (SECOND PREFERRED EMBODIMENT)

(SECOND PREFERRED EMBODIMENT)

(THIRD PREFERRED EMBODIMENT)

(THIRD PREFERRED EMBODIMENT)

(THIRD PREFERRED EMBODIMENT)

(THIRD PREFERRED EMBODIMENT)

CENTER SAMPLE STARTS 1/4 BIT EARLY (THIRD PREFERRED EMBODIMENT)

CENTER SAMPLE STARTS 1/4 BIT LATE (THIRD PREFERRED EMBODIMENT)

"+" ADD Δ TO TIMER COMPARE REGISTER (RETARD PHASE OF RECOVERED CLOCK)

"−" SUBTRACT Δ FROM TIMER COMPARE REGISTER (ADVANCE PHASE OF RECOVERED CLOCK)

"C" CENTER SAMPLE

"E" EDGE SAMPLE

ASYNCHRONOUS/SYNCHRONOUS DATA RECEIVER CIRCUIT

BACKGROUND OF THE INVENTION

This invention relates to the field of data communications receivers and more particularly to receiver circuits capable of receiving and decoding a complete data transmission of virtually any length without the benefit of a synchronizing preamble being transmitted before the data.

In digital radio frequency paging systems, data is sent to a particular personal paging receiver by transmitting the paging receiver's unique address code followed by the message. Personal paging receivers are normally equipped with battery saver circuits which activate the receiver circuits only for brief periodic intervals of time, the shorter the activation period, the less the battery drain. To keep this activation period at a minimum, asynchronous circuits are normally used because they require no synchronization period prior to receiving the address.

Asynchronous circuits have problems, however, which become more acute when the length of the message following the address is increased. First, a typical asynchronous circuit samples the incoming address at four times per bit and stores these samples in a sample register. After each new sample, the content of the sample register is compared to the correct address which is stored in the paging receiver's memory. If the content of the sample register is essentially the same as the correct address, then it is assumed that the following message is directed to that particular paging receiver But, since sampling only occurs at four times per bit, the initial phase alignment between the message and the receiver's asynchronous clock is only known within one-fourth of a bit. Furthermore, slight differences between the frequencies of the transmitting and receiving clocks cause further misalignment which eventually results in the receiver either dropping a received bit, or adding an extra unwanted bit. The longer the message is, the higher the probability that the transmitting and receiving clocks will eventually become misaligned.

To overcome these problems, highly accurate clock circuits can be utilized in both the transmitter and receiver asynchronous circuits, however, these are usually prohibitive because of cost and initial frequency alignment problems. Operating the transmitter and receiver in different temperature environments can also cause their respective clock frequencies to drift apart. Synchronous circuits can also be utilized in the personal paging receiver, however, such circuits need an additional synchronizing preamble immediately before the data, requiring that the receiver circuits be active during the preamble which results in increased battery drain.

SUMMARY OF THE INVENTION

It is an object of the invention to provide an improved data communications receiver.

It is another object of the invention to provide a circuit that can receive a data transmission of virtually any length without the benefit of a synchronizing preamble being transmitted prior to the data.

Still another object of the invention is to provide a battery operated data receiver circuit that reduces battery drain.

Briefly the invention includes a circuit for detecting a data signal wherein the data signal includes an address followed by a message. An asynchronous address detector detects the address and a synchronous clock recovery means synchronizes a recovered clock signal to the message. An initializing means is connected between the asynchronous address detector and the synchronous clock recovery means. The initializing means initializes the synchronous clock recovery means such that a predetermined phase relationship is established between the first bit of the recovered clock signal and the first bit of the message.

In another embodiment, the invention includes a circuit for detecting a data signal wherein the data signal includes an address followed by a message. An asynchronous address detector detects the address and a synchronous clock recovery means synchronizes a recovered clock signal to the data signal. An edge generator, which is connected to the synchronous clock recovery means, generates edge pulses on one edge of the recovered clock signal. An enabling means, which is connected between the asynchronous address detector and the edge generator, enables the edge generator when the address is detected by the asynchronous detector.

In still another embodiment, the invention includes a method for detecting a data signal wherein the data signal includes an address followed by a message. A first error count is found by counting the number of samples from a first set of data signal samples that fail to correlate with known address samples. It is then determined whether the first error count is less than a predetermined number. Next, a second error count is found by counting the number of samples from a second set of data samples that fail to correlate with the known address samples. A timer circuit is adjusted to a first number if the first error count is less than the second error count while the timer circuit is adjusted to a second number if the second error count is less than the first error count.

BRIEF DESCRIPTION OF THE DRAWINGS

FIG. 1 is a partial block diagram of a first preferred embodiment of the present invention.

FIG. 2 is a schematic diagram of a synchronous clock recovery circuit illustrating in detail the bit loop control logic and clock circuit of FIG. 1.

DESCRIPTION OF THE PREFERRED EMBODIMENTS

Figure 3A:
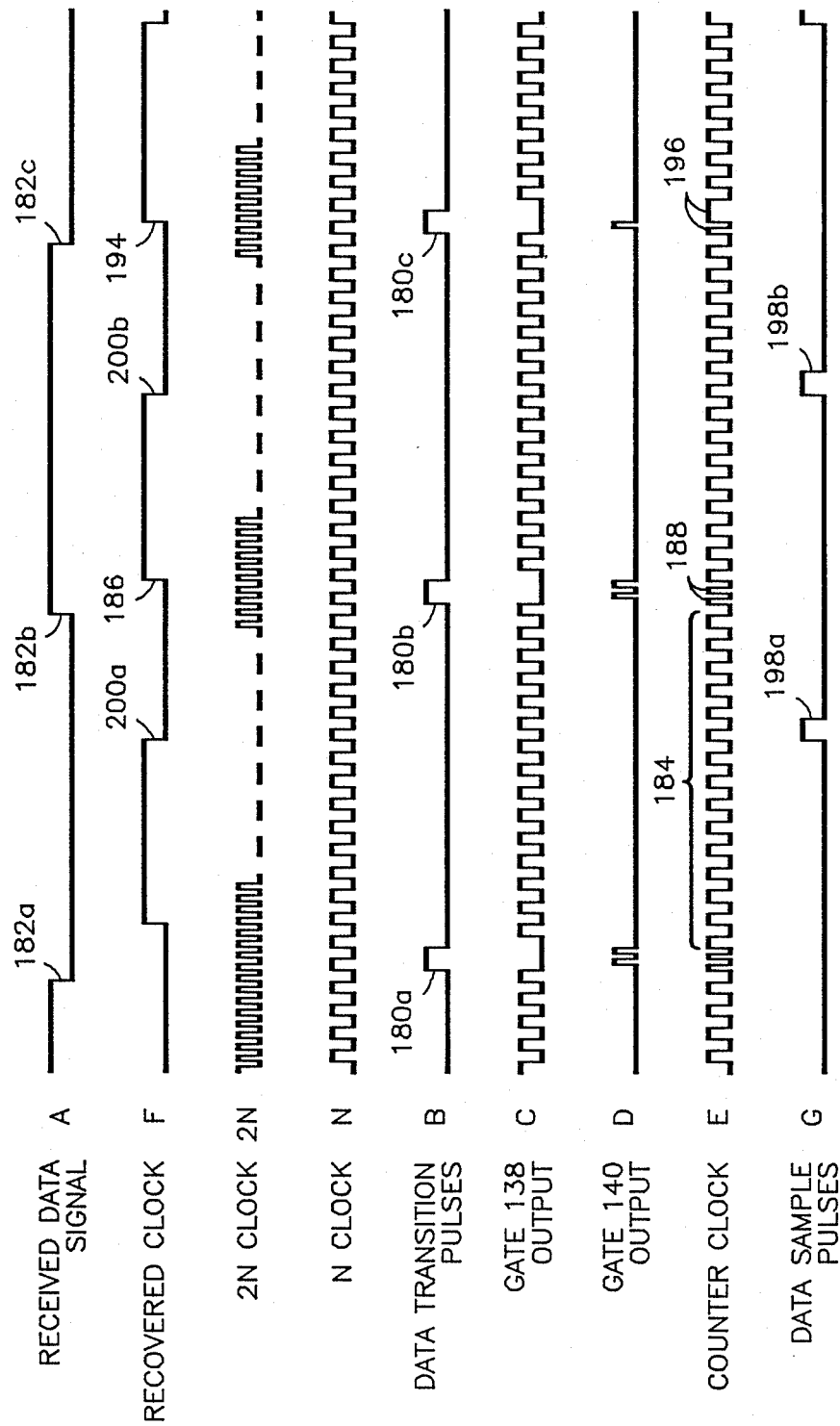
FIGS. 3a and 3b are timing diagrams showing the operation of the synchronous clock recovery circuit, with FIG. 3a illustrating the situation wherein the recovered clock signal initially lags the received data signal and FIG. 3b illustrating the situation wherein the recovered clock signal initially leads the received data signal.

A block diagram of a first preferred embodiment of the present invention is illustrated in FIG. 1. The data input of an asynchronous address detector 100 is connected to a received data signal, preferably limited data from the discriminator of a radio receiver. The received data signal is also connected to the data input of a message decoder, preferably a microprocessor (not shown). The reset input of asynchronous detector 100 is connected to a power ON reset signal, preferably from a power ON reset circuit in the radio. The word select output is connected to one input of a NOR gate 102 while the page detect output is connected to one input of a NOR gate 104. Asynchronous address detector 100 asynchronously detects a binary address transmitted to the receiver wherein the binary address preferably consists of two well known (23, 12) Golay code words separated by one-half a bit. Asynchronous address detector 100 is preferably constructed as described in U.S. Pat. No. 3,855,576 to Braun, et al.

The output of NOR gate 102 is connected to a second input of NOR gate 104 and the output of NOR gate 104 is connected to a second input of NOR gate 102. NOR gates 102 and 104 form an R-S latch 105 wherein the word select output of asynchronous address detector 100 is connected to the Reset input of the latch and the page detect output is connected to the Set input of the latch. The outputs of NOR gates 102 and 104 respectively form the Q and Q-NOT outputs of R-S latch 105. The output of NOR gate 102 is also connected to the set input of a D flip flop 106. Because the clock and data inputs of flip flop 106 are connected to ground, it will be obvious to those skilled in the art that flip flop 106 is connected as a R-S latch. The power ON reset is also connected to the input of an inverter 108 and the output of inverter 108 is connected to one input of a NOR gate 110. The output of NOR gate 110 is connected to the input of an inverter 112 and the output of inverter 112 is connected to the reset input of flip flop 106. Inverters 108 and 112 are preferably one third of a Motorola MC14069UB CMOS hex inverter. A Message Complete Signal from the microprocessor is connected to a second input of NOR gate 110.

The Q output of flip flop 106 and the output of NOR gate 104 are respectively connected to the reset and load inputs of a counter 114. Counter 114 is preferably a Motorola MC14161B synchronous programmable four bit binary counter. The data input of a bit loop control logic circuit 116 is connected to the received data signal. Bit loop control logic circuit 116 is described in greater detail below and illustrated in FIG. 2. The Q-NOT output of flip flop 106 is connected to the reset input of a flip flop 118. Flip flops 106 and 118 are preferably a Motorola MC14013B CMOS dual D flip flop. The Q3 output of counter 114 is connected to the recovered clock input of bit loop control logic 116. The clock output of bit loop control logic 116 is connected to the clock input of counter 114. The P0, P1, and P3 inputs of counter 114 are connected to ground while the P2, TE, and PE inputs are connected to a source of positive voltage. The Q3 output of counter 114 is also connected to the D input of flip flop 118 and to one input of a NOR gate 120. NOR gates 102, 104, 110, and 120 are preferably a Motorola MC14001B CMOS quad two input NOR gate. The Q-NOT output of flip flop 118 is connected to a second input of NOR gate 120. The output of NOR gate 120 is a data sample pulse which is connected to the microprocessor.

The N clock output of a clock circuit 122 is connected to the N clock input of bit loop control logic 116 and to the clock input of flip flop 118. Clock circuit 122 is also described in greater detail below and illustrated in FIG. 2. The 2N clock output of clock source 122 is connected to the 2N clock input of bit loop control logic 116. The N clock and 2N clock are multiples of the message data bit rate with N preferably being 16. Collectively, counter 114, bit loop control logic 116, and clock circuit 122 form a synchronous clock recovery circuit, well known in the art.

A synchronous clock recovery circuit is illustrated in FIG. 2, which includes a detailed schematic of bit loop control logic 116 and clock circuit 122. In bit loop control logic 116, the received data signal is connected to the D input of a flip flop 130 and the Q output of flip flop 130 is connected to the D input of a flip flop 132. Flip flops 130 and 132 are preferably a Motorola MC14013B CMOS dual D flip flop. The clock inputs of flip flops 130 and 132 are connected to the N clock of clock circuit 122. The set and reset inputs of flip flops 130 and 132 are connected to ground. The Q output of flip flop 130 is connected to one input of an Exclusive Or ("XOR") gate 134 while the Q output of flip flop 132 is connected to the second input of XOR gate 134.

The output of XOR gate 134 is connected to one input of an XOR gate 136, while the second input of XOR gate 136 is connected to a source of positive voltage. Those skilled in the art will understand that XOR gate 136 is interconnected as an inverter. XOR gates 134 and 136 are preferably one half of a Motorola MC14070B CMOS quad Exclusive Or gate. The output of XOR gate 134 is connected to one input of a three input NOR gate 138. The other two inputs of NOR gate 138 are connected to the N clock of clock circuit 122. The output of XOR gate 136 is connected to one input of a three input NOR gate 140. The Q3 output of counter 114 is connecetd to a second input of NOR gate 140 while the 2N clock output of clock circuit 122 is connecetd to a third input of NOR gate 140. The output of NOR gate 140 is connected to one input of a three input NOR gate 142 while the output of NOR gate 138 is connected to a second and third input of NOR gate 142. The output of NOR gate 142 is connecetd to the clock input of counter 114. NOR gates 138, 140, and 142 are preferably a Motorola MC14025B CMOS triple three input NOR gate.

Referring to clock circuit 122 of FIG. 2, wherein a resistor 144, having a preferred value of 10 Meg-Ohms, and a quartz crystal 146 are connected between the input and output of an inverter 148. Connected between each terminal of crystal 146 and ground is a capacitor 150 or 152, each preferably 15 pico-Farads. Crystal 146 is preferably a 2.112 Mega-Hertz "GT" cut crystal. Those skilled in the art will understand that inverter 148 is biased in its linear region, and inverter 148, resistor 144, crystal 146, and capacitors 150 and 152 form a well known CMOS crystal oscillator. The output of inverter 148 is connected to the input of an inverter 154 while the output of inverter 154 is connected to the clock input of a counter 156. Inverters 148 and 154 are preferrably one-third of a Motorola MC14069UB hex inverter.

The CTLA, DPA1, DPA3, CF, CTLB, DPB1, and DPB3 inputs of counter 156 are all connected to a source of positive voltage while the DPA2, DPA4, DPB2, and DPB4 inputs are all connected to ground. Those skilled in the art will understand that counter 156, which is preferably a Motorola MC14569B CMOS high speed programmable dual four bit counter, is configured to operate in a divide by 55 mode. The preset enable output of counter 156 is connected to the clock input of a D flip flop 158. Flip flop 158 has its set and reset inputs connected to ground and the Q-NOT output is connected back to the D input, thereby forming a divide by two stage. The Q output of flip flop 158 is connected to the clock input of a D flip flop 160. As with flip flop 158, flip flop 160 is also connected to form a divide by two stage. Flip flops 158 and 160 are preferably a Motorola MC14013B CMOS dual D flip flop. Since counter 156 is configured to divide by 55 and flip flop 158 to divide by 2, the frequency at the Q output of flip flop 158, which is the 2N clock output of clock circuit 122, is 2.112 MHz divided by 110 or 19,200 KHz. The frequency at the Q output of flip flop 160, which is the N clock output of clock circuit 122, is therefore 19,200 divided by 2 or 9,600 KHz.

Figure 3B:
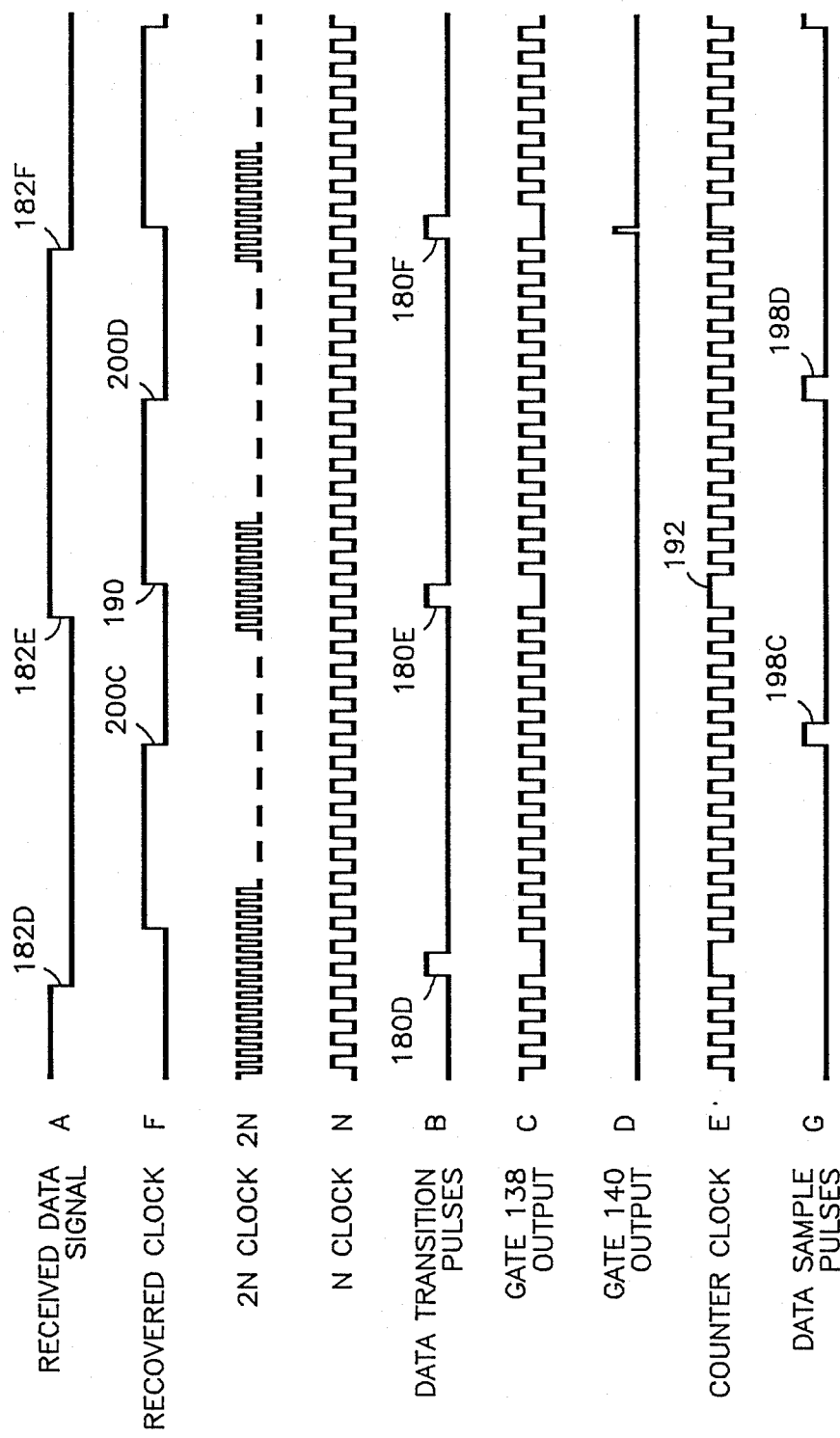

Timing diagrams are shown in FIGS. 3a and 3b to illustrate the operation of the synchronous clock recovery circuit of FIG. 2. Waveform A is the received binary data signal that appears at the data input of bit loop control logic 116, i.e. the D input of flip flop 130. Waveform F is the recovered clock that appears at the Q3 output of counter 114. Waveforms 2N and N are respectively the 2N and N clock output signals of clock circuit 122. The data transition pulses of waveform B correspond to transitions of the received data signal and appear at the output of XOR gate 134. Waveform E is the clock signal for counter 114. The data sample pulses of waveform G correspond to trailing edge transitions of the recovered clock and appear at the output of NOR gate 120. FIG. 3a illustrates the situation where positive transitions of the recovered clock initially lag transitions of the received data signal, while FIG. 3b illustrates the situation where positive transitions of the recovered clock initially lead transitions of the received data signal.

The operation of the synchronous clock recovery circuit of FIG. 2 can be understood by referring to FIGS. 2, 3a, and 3b. Flip flops 130 and 132, and XOR gate 134 form a transition pulse generator, which generates pulses 180a–180f when the received data signal makes a positive or negative transition respectively at points 182a–182f. Because flip flops 130 and 132 are cascaded in shift register fashion, the Q output of flip flop 132 is identical to the Q output of flip flop 130, except for a slight time delay equal to the period of the N clock. Therefore, the Q outputs of flip flops 130 and 132 will be in the same logic state except when a leading or trailing edge of the received data signal is encountered. At such a leading or trailing edge, the Q outputs of flip flop 130 and 132 will momentarily be different. It is a well known property of exclusive OR gates that they will generate a logical 1 output whenever their inputs are different. Thus, the output of XOR gate 134 is a logical 1 only when the Q outputs of flip flops 130 and 132 are different, thereby generating a data transition pulse every time the received data makes a transition from logical 0 to logical 1, or from logical 1 to logical 0.

XOR gate 136 and NOR gates 138, 140, and 142 form a combinational logic circuit that generates the counter clock signal for counter 114. There are four inputs to the combinational logic circuit, the data transition pulses, the recovered clock, and the N and 2N clocks from clock circuit 122. During times when there are no data transition pulses, for example period 184, the counter clock signal appearing at the output of the combinational logic circuit is simply N clock. When a data transition pulse occurs, however, the combinational logic circuit compares the recovered clock to the data transition pulse. If the leading edge of the recovered clock lags the data transition pulse, for example leading edge 186 lags pulse 180b in FIG. 3a, the combinational logic circuit generates two quick pulses 188 in the counter clock signal in the same period of time that normally only one pulse would appear. This has the effect of speeding up counter 114, which in turn advances the phase of the recovered clock at the Q3 output of the counter.

If the leading edge of the recovered clock leads the data transition pulse, for example leading edge 190 leads pulse 180e in FIG. 3b, the combinational logic circuit drops a pulse at point 192 in the counter clock signal. This effectively slows down counter 114 which retards the phase of the recovered clock at the Q3 output of the counter. If the leading edge of the recovered clock is substantially in phase with the data transition pulses, for example leading edge 194 is in phase with pulse 180c in FIG. 3a, then the combinational logic circuit neither inserts an additional pulse to, nor deletes a pulse from the counter clock signal. During this in phase condition, the two pulses 196 are slightly asymmetrical, however, by careful comparison to the N clock it will be understood that overall the two pulses 196 have the same period as two N clock pulses. Therefore, no phase changes are made to the recovered clock because it is now synchronized with the received data signal.

Thus, it can be seen that when the leading edge of the recovered clock lags a transition in the received data, an additional pulse is inserted in the counter clock signal to advance the phase of the recovered clock and bring it more in alignment with the received data transitions. But when the leading edge of the recovered clock leads a transition in the received data, a pulse is dropped from the counter clock signal to retard the phase of the recovered clock, also bringing it more in alignment with the received data transitions.

Although a microprocessor may be capable of using the recovered clock directly, it is often advantageous to include a leading or trailing edge pulse generating means between the recovered clock and the microprocessor. Flip flop 118 and NOR gate 120 form such a trailing edge pulse generator, outputting data sample pulses 198a–198d when the recovered clock makes a logical 1 to logical 0 transition respectively at edges 200a–200d. Flip flop 120 inverts and slightly delays the recovered clock signal, thus immediately after the recovered clock makes a high to low transition, the recovered clock and the inverted/delayed output of flip flop 120 are momentarily but simultaneously both low. Since a NOR gate only generates a high output when both inputs are low, NOR gate 122 produces a short pulse, such as pulses 198a–198d, whenever the recovered clock makes a transition from high to low.

Figure 4:
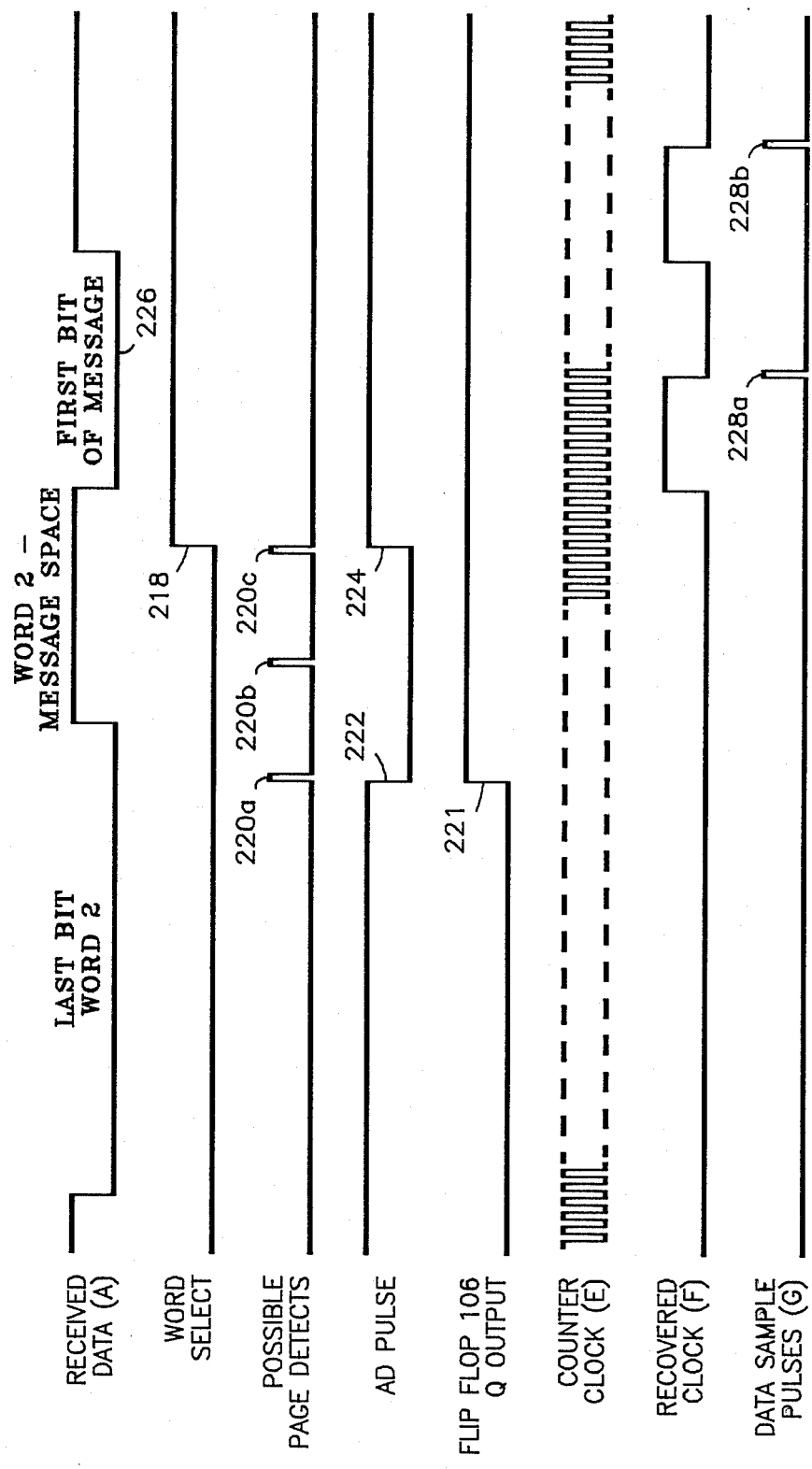
FIG. 4 is a timing diagram illustrating the operation of the first preferred embodiment of the present invention as shown in FIG. 1.

The operation of the first embodiment of the present invention can be understood by referring to FIG. 1 and to the timing diagram of FIG. 4. It is assumed that the received data signal comprises a string of addresses wherein each address consists of two (23, 12) binary Golay code words. Each address may be followed by a message.

At power ON the word select line of asynchronous address detector 100 goes high forcing the Q output of R-S latch 105 low. The power ON reset pulse forces flip flop 106 to be reset which in turn holds flip flop 118 and counter 114 reset until such time as flip flop 106 is set. Upon detecting the first address word of the two word address, the word select line goes low and remains low until immediately after the second address word is completed, whereupon the word select line returns high at point 218, regardless of whether or not the second address word is detected. If the second address word is detected a page detect pulse 220a, b, or c is generated at the page detect output of asynchronous address detector 100. Although FIG. 4 shows 3 possible page detect pulses 220a, b, and c, all three pulses will not necessarily occur. It will be assumed for purposes of illustration, however, that page detect pulse 220a is the first pulse to occur. Page detect pulse 220a sets R-S latch 105 which in turn sets flip flop 106 causing the reset signals to be removed at point 221 from counter 114 and flip flop 118. Simultaneously, the load input to counter 114 goes low at point 222 causing the counter to be preset at the next clock pulse. Counter 114 is not enabled, however, until the load input returns high at point 224. When the word select line goes high at 218, R-S latch 105 is reset which in turn switches the load input of counter 114 high, thereby enabling the counter. Thus, asynchronous address detector 100 and R-S latch 105 provide a means for initializing counter 114. The word select line goes high about twelve N clocks before the center of the first bit 226 of the message, thereby synchronizing the recovered clock (Q3 output of counter 114) with the first bit of the message.

Synchronization of succeeding bits is accomplished by the synchronous clock recovery circuit as previously described. Because the synchronous clock recovery circuit continuously makes minor corrections in the phase of the recovered clock to keep it synchronized with the received data signal, the message can be virtually of any length. The message is decoded by a microprocessor (not shown) by sampling the received data at the data sampling pulses, for example 228a and b. Upon completion of the message, the microprocessor sends a message complete pulse to NOR gate 110 which in turn resets flip flop 106, thereby completing one address-message cycle. Thus, R-S latch 106, NOR gate 110, and inverter 112 provide a means for inhibiting counter 114 at the end of the message.

Figure 5:
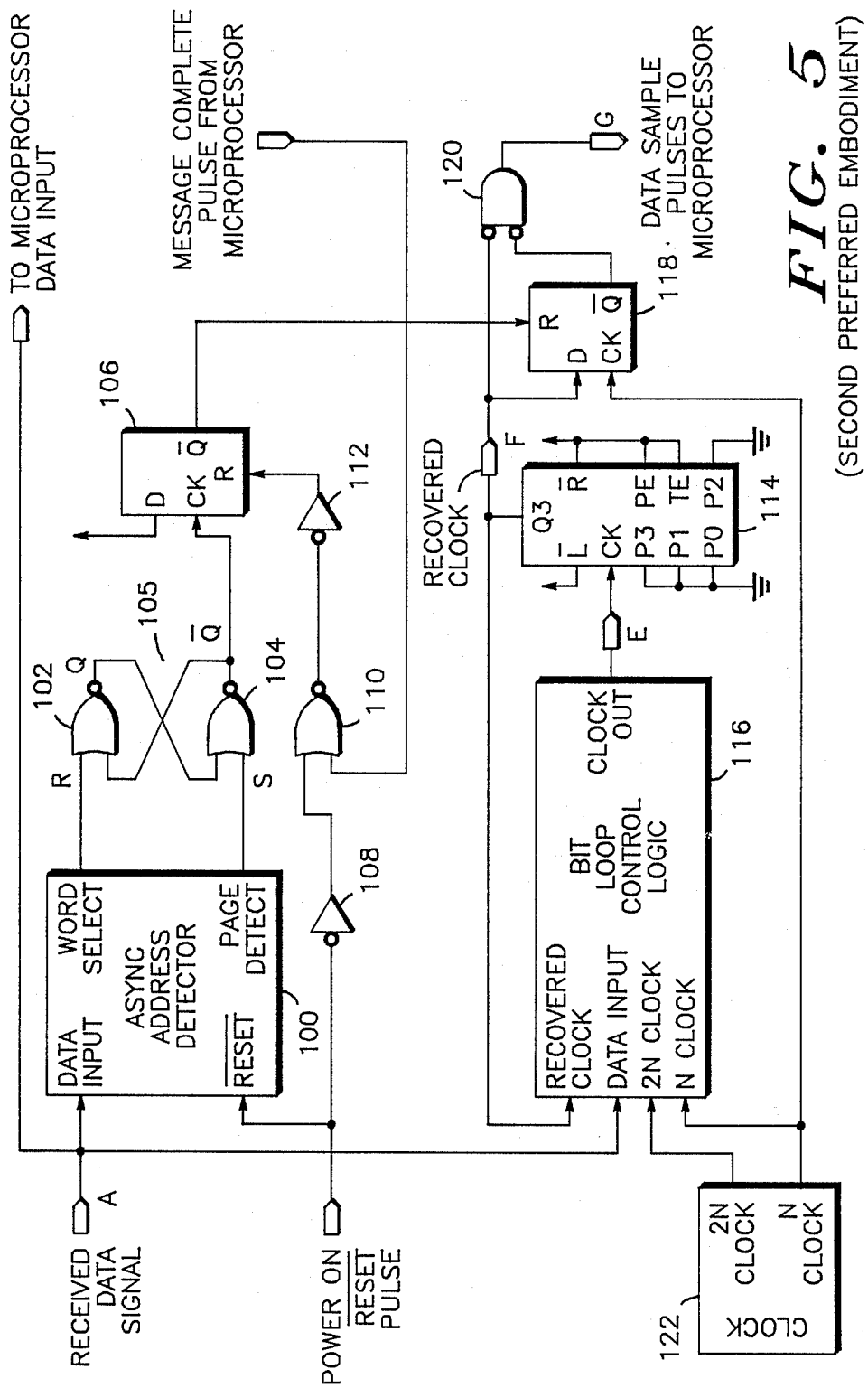
FIG. 5 is a partial block diagram of a second preferred embodiment of the present invention.

A second preferred embodiment of the present invention is illustrated in FIG. 5. FIG. 5 is similar to FIG. 1 except that the load and reset inputs of counter 114 are connected to a source of positive voltage, thereby disabling both of these inputs, and the P2 input of the counter is connected to ground. Also, the D input of flip flop 106 is connected to a source of positive voltage and the clock input is connected to the Q-NOT output of R-S latch 105.

The synchronous clock recovery circuit, comprised of bit loop control logic 116, counter 114, and clock 122, functions as previously described, however, in the second preferred embodiment of FIG. 5 it runs continuously, synchronizing the recovered clock not only on received message bits, but also on address bits. Even though the clock recovery circuit runs continuously, data sample pulses are only sent to the microprocessor (not shown) after address detect and only for the duration of the message bits. Asynchronous address detector 100, R-S latch 105, and R-S latch 106 function as an enabling means, enabling the edge pulse generating means (flip-flop 118 and NOR gate 120) at the first bit of the message. R-S latch 106, NOR gate 110, and inverter 112 function as an inhibiting means, disabling the trailing edge pulse generating means at the completion of the message.

Figure 6:
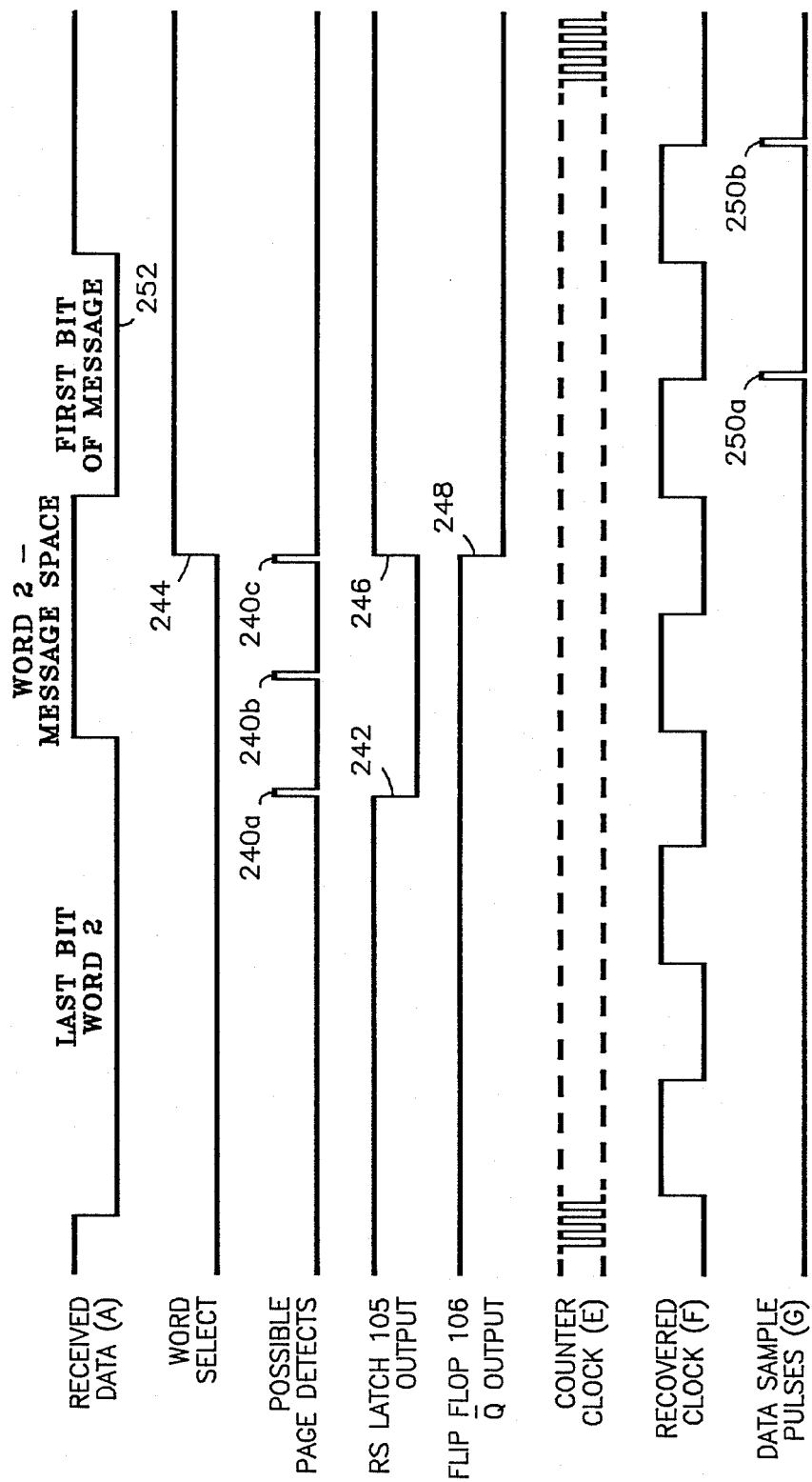
FIG. 6 is a timing diagram illustrating the operation of the second preferred embodiment of the present invention as shown in FIG. 5.

The operation of the second preferred embodiment of the present invention can be understood by referring to FIG. 5 and to the timing diagram of FIG. 6. As before, the received data signal comprises a string of addresses wherein each address preferably consists of two (23,12) Golay code words and each address may be followed by a message.

At power ON the word select line goes high resetting R-S latch 105 and the power on reset pulse resets flip flop 106. The Q-NOT output of flip flop 106 is then high, thereby holding flip flop 118 reset and inhibiting data sample pulses from reaching the microprocessor. Upon detecting the first word of the address, the word select line goes low. Upon detecting the second word of the address, a page detect pulse 240a, b, or c is generated at the page detect output of asynchronous address detector 100. The first page detect pulse 240a sets R-S latch 105 causing the Q-NOT output to go low at 242. At the completion of the second address word, the word select line goes high at 244, resetting R-S latch 105 and causing the Q-NOT output to go high at 246. When the Q-NOT output of latch 105 goes high, a logical 1 is clocked into flip flop 106 causing its Q-NOT output to go low at 248, thereby enabling flip flop 118 and data sample pulses 250a and 250b. It should be noted that the first data sample pulse 250a is centered in the first bit 252 of the message. These data sample pulses will continue until the microprocessor detects the end of the message and sends a Message Complete Pulse which resets flip flop 106, thereby disabling the data sample pulses.

In a third embodiment of the present invention, a data input port of a microprocessor, preferably a Motorola MC68HC05C4 CMOS microprocessor, is connected to the received data signal. In this embodiment, all the functions of asynchronous address detection and synchronous clock recovery that were previously described in relationship to FIG. 1 are implemented in software.

Steps 300, 302, and 304 comprise an iterative loop 306 which searches for word one of the address. In step 300, the received data signal is sampled at four times the bit rate and the samples are stored in four 23 bit registers. Each time through loop 306, one additional sample is added to the appropriate 23 bit register in the following fashion: the first received sample and every fourth sample thereafter is added to the first register, the second sample and every fourth sample thereafter is added to the second register, the third sample and every fourth sample thereafter is added to the third register, and the fourth sample and every fourth sample thereafter is added to the fourth register. In step 302, each 23 bit register is compared with a reference register by Exclusive ORing corresponding bits. After correlation, an error sum is generated for each of the four 23 bit registers. In step 304, a total error sum is calcuated by adding the error sums of the individual 23 bit registers. If the total error sum is less than 12, word one detection has been achieved and the program proceeds to step 308. If the total error sum is greater than 80, the inverse of word one has been detected and the program again proceeds to step 308. If the error sum is between 12 and 80, word one detection has not occurred and the program returns to step 300 whereupon an addtional sample of the received data is taken and stored in the appropriate 23 bit register as previously described.

Steps 308, 310, and 312 search for word two of the address in a similar fashion as loop 306 searches for word one of the address. For word two detection, however, the correlation at an error sum does not have to be performed for every sample as it was in word one loop 306. This is because the time at which the last bit of word two is received is known to occur within a very narrow window. Therefore, after a first set of data samples is taken by filling four 23 bit registers in step 308, it is only necessary to perform one correlation of those registers to a word two reference register in step 310. As in step 302, step 310 also computes an error sum and in step 312, if that sum is less than 12 or greater than 80 a word two detection has been achieved. If the error sum is between 12 and 80, word two detection has not occurred and the program returns to step 300 to search for word one again. If word two detection has been achieved, it is possible that detection has occurred early. To ensure that the proper timing is established before entering the data decoder subroutine it is necessary to look at a second set of data signal samples by taking an extra sample in step 314 and shifting that extra sample onto the appropriate 23 bit register.

Figure 7:
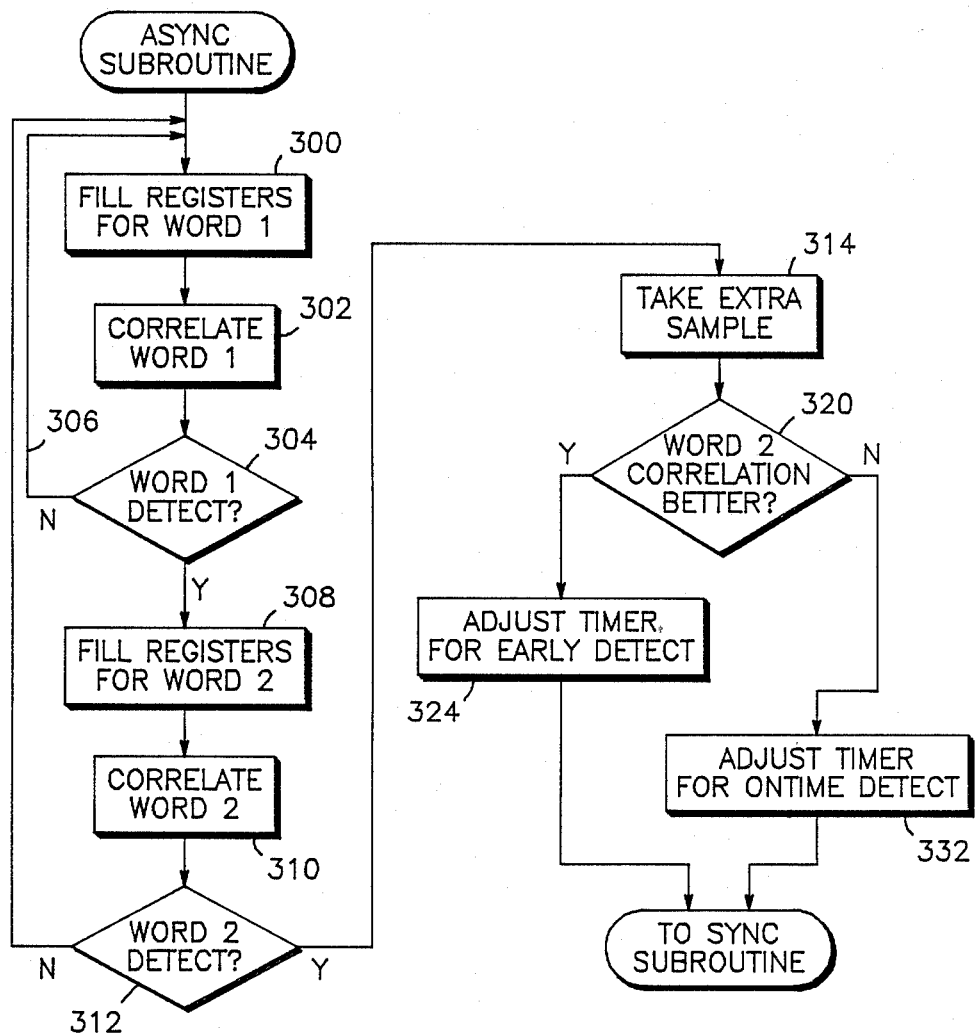
FIG. 7 is a flowchart of an asynchronous address detection subroutine.
Figure 8A:
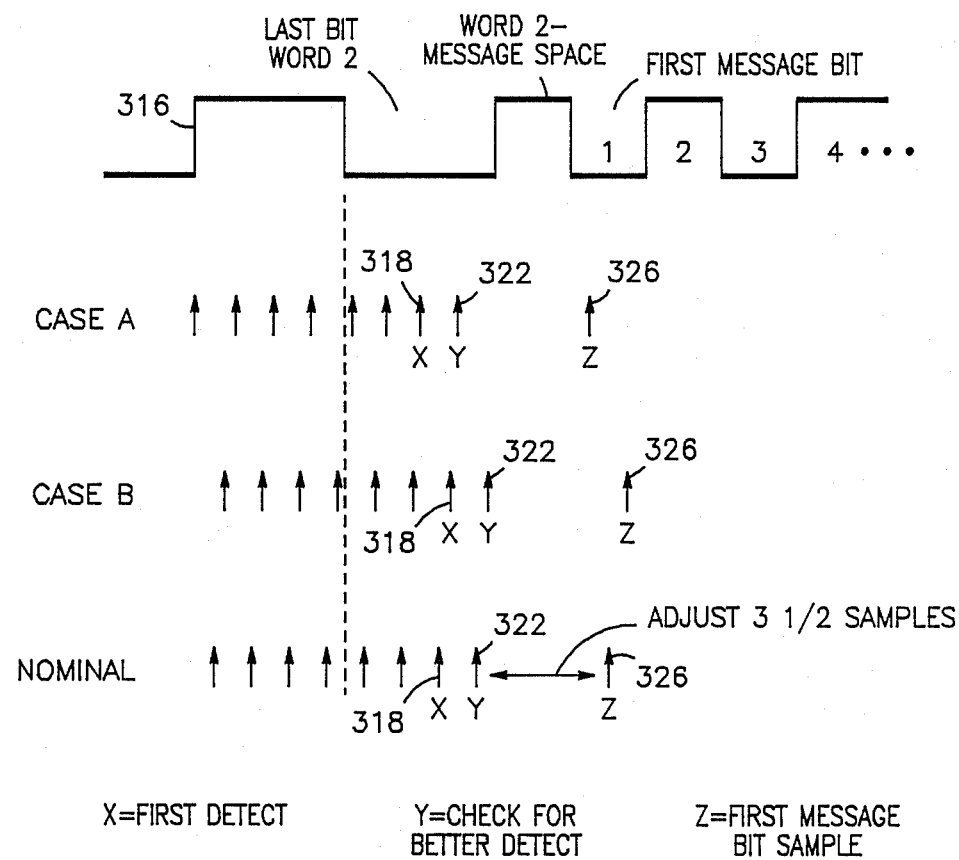
FIGS. 8a and 8b are timing diagrams useful in understanding the operation of the asynchronous address detector subroutine of FIG. 7.
Figure 8B:
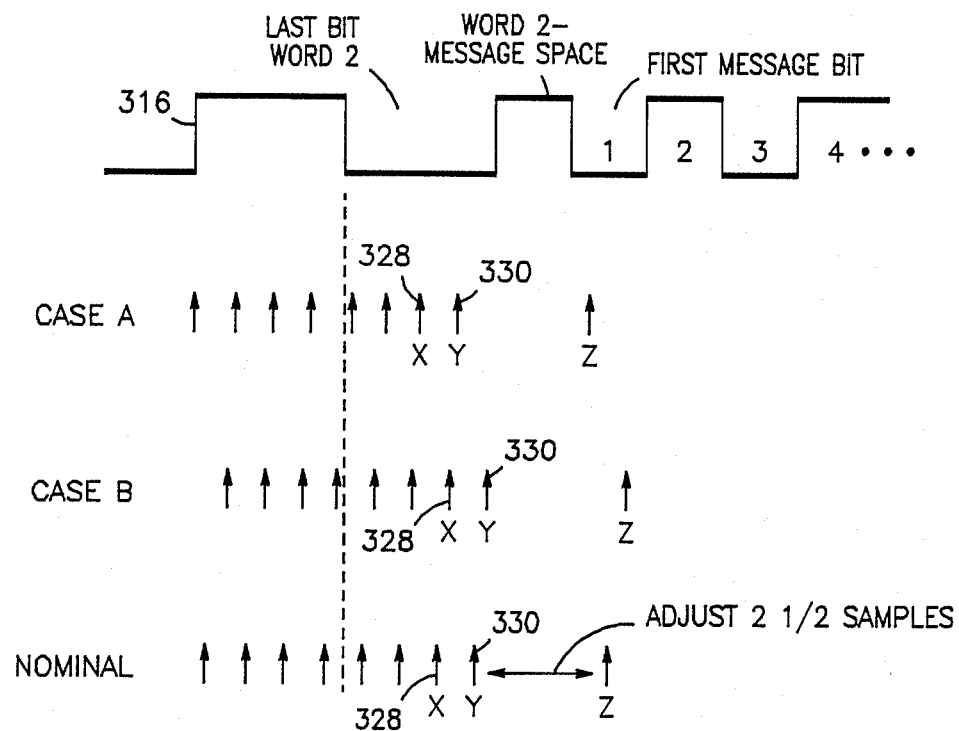

Early detection and on-time detection can be understood by referring to FIGS. 8a and 8b. In both FIGS. 8a and 8b, the nominal sampling times are indicated by the bottom row of sampling arrows while the worst case conditions are indicated by Case A and Case B. FIG. 8a illustrates a situation where an early detection has occurred, that is, a word two detection has occurred at the third sample into the last bit of word two. This detection is indicated by the sampling time 318 which is indicated graphically by the sampling arrow with the subscript "X". For the proper timing of the syncrhonous clock recovery subroutine, it is advantageous to know that a word two detect has occurred during the fourth sample of the last bit of word two. Therefore, step 314 of FIG. 7 takes one more sample from the received data signal 316 and another correlation with the word two reference register is performed in step 320. This additional sample is indicated in FIG. 8a as sample 322. An early detection is indicated if a lower error sum is obtained after taking fourth sample 322 than was obtained with third sample 318. In the example of FIG. 8a, an early detection has occurred at sampling time 318, therefore, step 324 of FIG. 7 is executed next. In step 324, an internal timer comparison register is adjusted such that the first sample 326 occurs 3.5 samples from sampling time 322. Thus, in the nominal case of FIG. 8a, the first sample 326 of the first message bit occurs in the center of the first message bit, while in the worst case conditions of Case A and Case B the first center sample occurs within plus or minus one-fourth of a bit from nominal sampling time 326.

FIG. 8b illustrates a situation wherein an on-time condition has occurred. In this example, a word two detection has occurred at sampling time 328, which is the fourth sample into the last bit of word two. In step 314, additional sample 330 is taken, however, sample 330 occurs during the word two message space. Therefore, in step 320 the correlation between the received samples and the word two reference register will indicate that more errors were found in step 312. This indicates that the first sample, 328, was the correct or on-time sample. Therefore, the internal timer comparison register is adjusted such that the first center sample of the first bit of the message occurs just 2.5 samples after sampling time 330. Again, in the nominal case, the center sample occurs at the center of the first message bit, while in the worst case conditions of Case A and Case B, the center samples occur within plus or minus one-fourth of a bit from the center of the first message bit. This adjustment occurs in timer adjustment step 332 of FIG. 7. After the timer comparison register has been adjusted in either step 324 or 332, the program jumps to the synchronous subroutine of FIG. 9.

Figure 9:
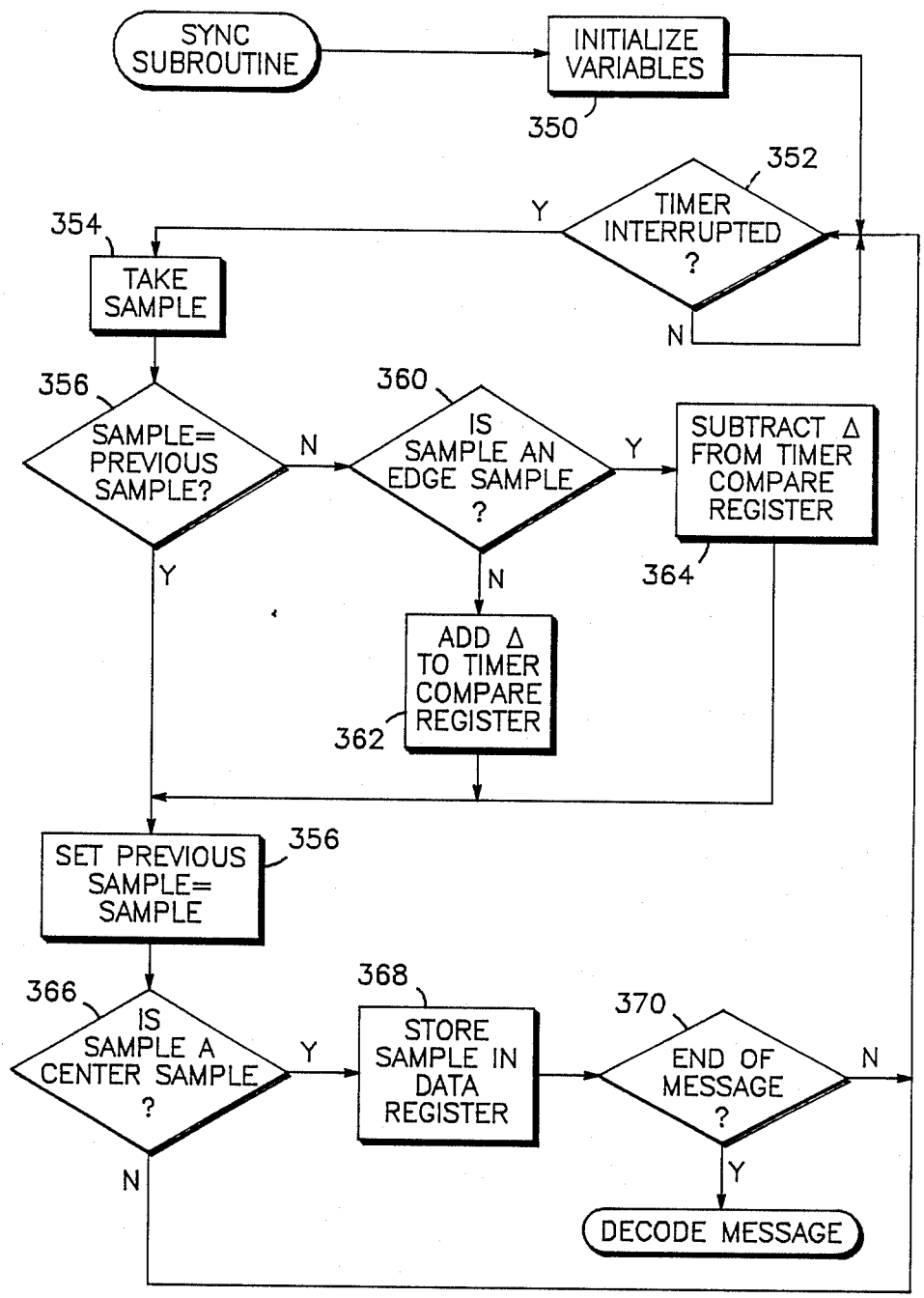
FIG. 9 is a flowchart of a synchronous clock recovery subroutine.

FIG. 9 is a flowchart of the synchronous subroutine that implements the synchronous clock recovery circuitry previously described. In step 350, certain variables required by the subroutine are initialized. In the next step 352, the microprocessor waits for a timer interrupt, after which a center sample of the received message is taken in step 354. Each time through the loop samples are alternately classified as being either center or edge samples. To keep track of whether the sample is an edge sample or a center sample, a indicator bit in a register is toggled each time a sample is taken.

In step 356, the sample from step 354 is compared to the previous sample. If it is the first time that step 356 is executed after entering the synchronous subroutine, there is no previous sample; however, the previous sample can either be initialized to a one or a zero in step 350 or simply taken to be whatever state that particular register bit happens to be in. If the sample equals the previous sample, step 358 is executed and the previous sample register is set equal to the sample register.

If the sample differs from the previous sample, then step 360 is executed to determine whether the sample is an edge sample or a center sample. If the sample is a center sample, step 362 is executed and a small increment delta is added to the value of the timer compare register. The MC68HC05C4 microprocessor has an internal upcounting timer that generates an interrupt whenever the value of the timer equals the value in the compare register. Thus, by adding a small increment delta to the value stored in the timer compare register essentially increases the time between timer interrupts. As will be explained in greater detail later in connection with FIG. 10, this has the effect of retarding the phase of the recovered clock. If the sample is an edge sample, step 364 is executed and a small incremented delta is subtrated from the timer compare register. This shortens the time between interrupts and has the effect of advancing the phase of the recovered clock.

After adjusting the timer in either step 362 or 364, the subroutine branches to step 358 wherein, as previously explained, the previous sample register is set equal to the present sample. Next, step 366 inquires whether the sample is a center sample or an edge sample. If the sample is an edge sample, the subroutine branches back to the wait-for-timer interrupt step 352. If the sample is a center sample, that sample is stored in a data register in step 368. Step 370 determines whether the most recent sample stored in the data register is the last sample of the message; if it is, the program branches to a decode-message subroutine. This decode-message subroutine is dependent upon the particular algorithm that is used to encode the message at the transmitting end and is not described herein. If the last sample stored in the data register in step 368 is not the last bit of the message, then the subroutine branches back to the wait-for-timer interrupt step 352 whereupon the previously described process will be repeated until the last data bit has been stored in the data register.

Figure 10A:
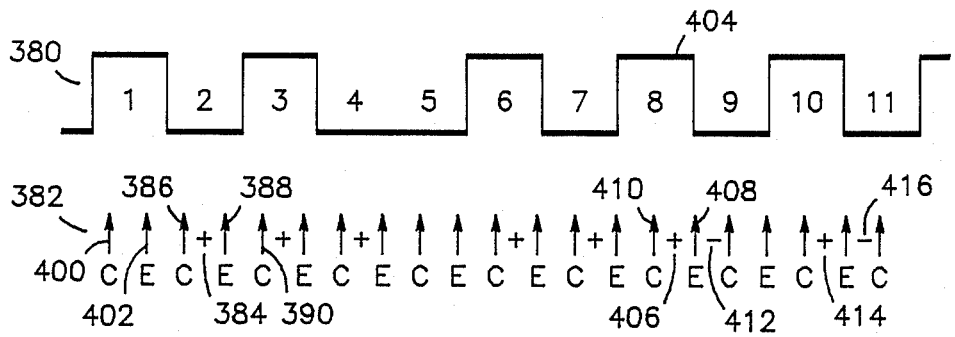
FIGS. 10a and 10b are timing diagrams useful in understanding the operation of the synchronous clock recovery subroutine of FIG. 9.
Figure 10B:
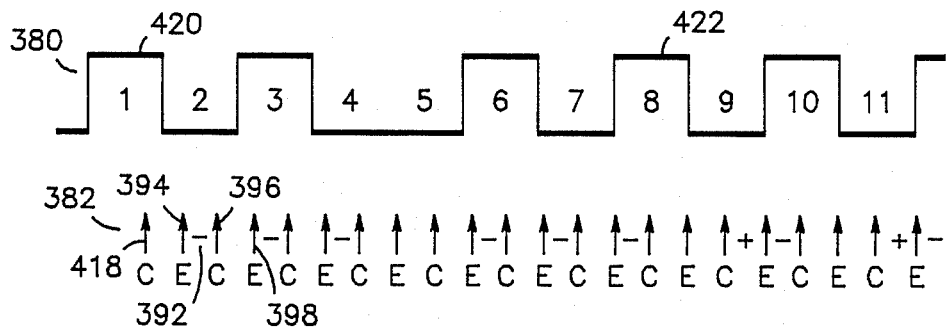

The operation of the synchronous subroutine of FIG. 9 can be understood by referring to the timing diagrams of FIGS. 10a and 10b. FIGS. 10a and 10b illustrate a received message signal 380 and the sampling times, generally designated as 382. The "+" sign, for example "+" 384, indicates that a small increment delta has been added to the nominal value of the timer compare register. In other words, step 360 of FIG. 9 has been executed and it has been determined that the sample is a center sample. Therefore, the program branches to 362 whereupon the small increment delta is added to the timer compare register. This has the effect of extending the time between samples; therefore, the time between sample pulses 386 and 388 will be greater than the time between sample pulses 388 and 390. In a similar manner, the "−" sign, for example "−" sign 392, indicates that a small increment delta has been subtracted from the compare register. In executing step 360 of FIG. 9, it has been found that the sample is an edge sample; therefore, step 364 is executed whereupon the small increment delta is subtracted from the nominal value of the timer compare register. Thus, when a small increment delta is subtracted from the nominal value of the timer compare register, the time between adjacent samples, for example 394 and 396, is less than the time between adjacent samples 396 and 398.

It is the object of the synchronous subroutine to position the center samples directly in the center of each of the message bits. Alternatively, the object of the synchronous subroutine can be viewed as positioning the edge samples at the transitions or edges of the message bits. FIG. 10a illustrates a situation wherein a center bit starts one-fourth bit early, that is to say, one-fourth bit prior to the center of the first message bit. FIG. 10b illustrates a situation wherein the center bit starts one-fourth bit late, that is one-fourth bit after the center of the first message bit.

Referring to FIG. 10a, the first two samples 400 and 402 are identical. Therefore, step 356 of FIG. 9 branches to step 358 and no increment is added or subtracted to the nominal value of the timer compare register. The third sample 386, however, differs from the state of sample 402. Therefore, step 356 branches to step 360 whereupon step 360 determines that sample 386 is a center sample. Therefore step 362 is executed next and a small increment delta is added to the timer compare register. As previously explained, this lengthens the time interval between sample time 388 and 386. Sample 388 has the same value as sample 386, therefore, when step 356 is executed it branches immediately to step 358 and no increment delta is added or subtracted to the timer compare register. When sample 390 is taken, however, it differs from the logical state of the sample taken at sampling time 388. Therefore, step 356 branches to step 360 whereupon it is determined that sample 390 is a center sample and an increment is added to the timer compare register.

This process continues through the eighth bit 404 of the message whereupon, when increment 406 is added to the timer compare register, the next sample time now occurs on an edge sample 408. Because edge sample 408 differs in value from center sample 410, step 356 branches to step 360. This time, however, step 360 determines that that sample is an edge sample and, therefore, the subroutine branches to step 364 and the small increment delta is subtracted from the timer compare register. At samping time 408, the synchronous subroutine has achieved is objective of aligning an edge sample pulse with a transition in the message or, in the alternative, the subroutine has achieved its objective of aligning center sampling time 410 substantially in the center of message bit 404. For the remainder of the message, corrections will still continue to be made in the phase of recovery clock, for example corrections 412, 414, and 416, to ensure that the edge samples are properly aligned with transitions in the message and to ensure that the center samples are approximately in the center of each of the message bits.

Referring to FIG. 10, it can be seen that an opposite but similar process occurs when the first center sample 418 occurs one-fourth bit late, that is one fourth bit after the true center of the first bit 420 of message signal 380. These corrections, for example 392, are subtractions from the timer compare register and continue through to the eighth bit 422 whereupon the edge samples are substantially in alignment with the transitions of the eighth message bit 422, and the center samples are substantially in alignment with the center of the message bits. As before, minor corrections will continue to be made throughout the entire length of the message.

We claim:

1. A circuit for detecting a data signal, said data signal including an address followed by a message, said circuit comprising in combination:
    asynchronous address detector means for asynchronously detecting said address;
    synchronous clock recovery means for synchronizing a recovered clock signal to said message; and
    initializing means, connected between said asynchronous address detector means and said synchronous clock recovery means, for initializing said synchronous clock recovery means, wherein a predetermined phase relationship is established between the first bit of said recovered clock signal and the first bit of said message.

2. The circuit of claim 1, wherein said synchronous clock recovery means includes a counter having a first input connected to said initializing means, whereby said counter is enabled by said intializing means.

3. The circuit of claim 2, wherein said counter is preset to a predetermined state by said initializing means.

4. The circuit of claim 1, wherein said synchronous clock recovery means includes a counter having a first input connected to said initializing means, wherein said counter is preset to a predetermined state by said initializing means.

5. The circuit of claim 1, further comprising inhibiting means, connected to said synchronous clock recovery means, for inhibiting said synchronous clock recovery means upon the completion of said message.

6. The circuit of claim 5, wherein said synchronous clock recovery means includes a counter having a first input for enabling said counter, said first input being connected to said initializing means, and a second input for disabling said counter, said second input being connected to said inhibiting means.

7. The circuit of claim 6, wherein said counter is preset to a predetermined state by said initializing means.

8. The circuit of claim 7, further comprising edge pulse generator means, connected to said synchronous clock recovery means, for generating edge pulses on one edge of said recovered clock signal.

9. The circuit of claim 7, wherein said synchronous clock recovery means includes:
   transition pulse generator means for generating pulses at the transitions of said data signal; and
   a combinational logic circuit connected between said transition pulse generator means and said counter.

10. The circuit of claim 9, further comprising edge pulse generator means, connected to said synchronous clock recovery means, for generating edge pulses on one edge of said recovered clock signal.

11. A circuit for detecting a data signal, said data signal including an address followed by a message, said circuit comprising in combination:
    asynchronous address detector means for asynchronously detecting said address;
    synchronous clock recovery means for synchronizing a recovered clock signal to said data signal;
    edge generator means, connected to said synchronous clock recovery means, for generating edge pulses on one edge of said recovered clock signal; and
    enabling means, connected between said asynchronous address detector means and said edge generator means, for enabling said edge generator when said address is detected by said asynchronous detector means.

12. The circuit of claim 11, further comprising inhibiting means, connected to said edge generator means, for inhibiting said synchronous clock recovery means upon the completion of said message.

13. The circuit of claim 12, wherein said synchronous clock recovery means comprises:
    transition pulse generator means for generating pulses at the transitions of said data signal;
    a counter, connected to said edge generator means; and
    a combinational logic circuit connected between said transition pulse generator means and said counter.

14. A method for detecting a data signal, said data signal including an address followed by a message, comprising the steps of:
    counting the number of samples, from a first set of data signal samples, that fail to correlate with known address samples, whereby a first error count is produced;
    determining that said first error count is less than a predetermined number of errors;
    counting the number of samples, from a second set of data signals samples, that fail to correlate with said known address samples, whereby a second error count is produced;
    adjusting a timer circuit to a first number if said first error count is less than said second error count; and
    adjusting said timer circuit to a second number if said second error count is less than said first error count.

15. The method of claim 14, further comprising the steps of:
    waiting for said timer circuit to reach a predetermined value;
    sampling said data signal whereby said sampling occurs substantially in the center of the first message bit.

16. The method of claim 14, further comprising the step of synchronously sampling said message bits.

17. The method of claim 16, wherein the step of synchronously sampling said message bits includes the steps of:
    waiting for said timer circuit to reach a predetermined value;
    taking a present sample of said message;
    toggling an indicator bit, whereby a center present sample is indicated when said indicator bit is in a first state and an edge present sample is indicated when said indicator bit is in a second state;
    adding a first number to said timer circuit if said present sample does not equal a previous sample and if said indicator bit is in said first state; and
    subtracting a second number to said timer circuit if said present sample does not equal said previous sample and if said indicator bit is in said second state.

18. The method of claim 17, wherein the step of synchronously sampling said message bits further includes the steps of:
    setting said previous sample equal to said present sample;
    returning to the step of waiting for said timer circuit to reach a predetermined value, if said indicator bit is in said second state;
    storing said present sample in a data register if said indicator bit is in said first state;
    returning to the step of waiting for said timer circuit to reach a predetermined value, if said present sample is not the last bit of said message.

19. The method of claim 14, wherein said first set of data signal samples are collected by:
    periodically sampling said data signal;
    storing the samples of the previous step in a data register.

20. The method of claim 19, wherein said second set of data signal samples are collected by:
    collecting said first set of data signal samples in said data register; and
    shifting one more sample of said data signal into said data register.

* * * * *